United States Patent
Zhu et al.

(10) Patent No.: US 11,340,613 B2
(45) Date of Patent: May 24, 2022

(54) COMMUNICATIONS PROTOCOLS BETWEEN PLANNING AND CONTROL OF AUTONOMOUS DRIVING VEHICLE

(71) Applicants: Baidu USA LLC, Sunnyvale, CA (US); Baidu.com Times Technology (Beijing) Co., Ltd., Beijing (CN)

(72) Inventors: Fan Zhu, Sunnyvale, CA (US); Lin Ma, Beijing (CN); Xin Xu, Beijing (CN); Jingao Wang, Sunnyvale, CA (US)

(73) Assignees: BAIDU USA LLC, Sunnyvale, CA (US); BAIDU.COM TIMES TECHNOLOGY (BEIJING) CO. LTD., Beijing (CN)

( * ) Notice: Subject to any disclaimer, the term of this patent is extended or adjusted under 35 U.S.C. 154(b) by 404 days.

(21) Appl. No.: 16/338,462

(22) PCT Filed: Mar. 29, 2019

(86) PCT No.: PCT/CN2019/080413
§ 371 (c)(1),
(2) Date: Mar. 30, 2019

(87) PCT Pub. No.: WO2020/198937
PCT Pub. Date: Oct. 8, 2020

(65) Prior Publication Data
US 2021/0191402 A1      Jun. 24, 2021

(51) Int. Cl.
*G05D 1/02* (2020.01)
*B60R 16/023* (2006.01)

(52) U.S. Cl.
CPC ....... *G05D 1/0212* (2013.01); *B60R 16/0231* (2013.01)

(58) Field of Classification Search
CPC .......................... G05D 1/0212; B60R 16/0231
See application file for complete search history.

(56) References Cited

U.S. PATENT DOCUMENTS

| | | | |
|---|---|---|---|
| 10,955,855 B1* | 3/2021 | Tran | B60R 11/04 |
| 2014/0018994 A1* | 1/2014 | Panzarella | A61G 5/043 |
| | | | 701/25 |
| 2017/0123429 A1* | 5/2017 | Levinson | G01C 21/34 |
| 2018/0220309 A1* | 8/2018 | Gomes | G07C 5/008 |
| 2018/0284801 A1* | 10/2018 | Guterman | G05D 1/0088 |

* cited by examiner

*Primary Examiner* — Richard M Camby
(74) *Attorney, Agent, or Firm* — Womble Bond Dickinson (US) LLP

(57) ABSTRACT

Based on sensor data obtained from a variety of sensors, a driving environment surrounding an autonomous driving vehicle (ADV) is perceived, including perceiving and identifying one or more obstacles. A trajectory is planned based on the perception data according to a set of rules to drive the ADV navigating through the driving environment. Trajectory data representing the trajectory is generated, where the trajectory data includes information indicating target or expected vehicle states at different points in time along the trajectory. The trajectory data is then transmitted in a sequence or a stream of one or more controller area network (CAN) messages to an electronic control unit (ECU) of the ADV over a CAN bus. The ECU is configured to generate and issue one or more control commands (e.g., throttle, brake, steering commands) based on the trajectory data to drive the ADV according to the trajectory.

20 Claims, 9 Drawing Sheets

| Header 601 | Ref. Point 1 (full) 602 | Ref. Point 2 (incremental) 603 | Ref. Point 3 (incremental) 604 | ... | Ref. Point N (incremental) 605 | Control Mode 606 |

COMMUNICATIONS PROTOCOLS BETWEEN PLANNING AND CONTROL OF AUTONOMOUS DRIVING VEHICLE

CROSS-REFERENCE TO RELATED APPLICATION

This patent application is a U.S. National Phase Application under 35 U.S.C. § 371 of International Application No. PCT/CN2019/080413, filed Mar. 29, 2019, entitled "COMMUNICATIONS PROTOCOLS BETWEEN PLANNING AND CONTROL OF AUTONOMOUS DRIVING VEHICLE," which is incorporated by reference herein by its entirety.

TECHNICAL FIELD

Embodiments of the present disclosure relate generally to operating autonomous vehicles. More particularly, embodiments of the disclosure relate to a communication interface between planning and control of autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Typically, communications between planning and control and the vehicle can be carried via a controller area network (CAN) bus. Although CAN is a very reliable and stable way for passing messages, however, it may not be the best way to convey a large amount of data due to its size limitation (e.g., 64 bits) bandwidth per message. Thus a better communication protocol is needed.

SUMMARY

In an aspect of the disclosure, a computer-implemented method for operating an autonomous driving vehicle is provided. The method includes: perceiving a driving environment surrounding an autonomous driving vehicle (ADV) based on sensor data obtained from a plurality of sensors, including identifying one or more obstacles; planning a trajectory based on perception data representing the driving environment to drive the ADV navigating through the driving environment; generating trajectory data representing the trajectory including targeted vehicle states at different points in time along the trajectory; and transmitting a stream of controller area network (CAN) messages containing the trajectory data to an electronic control unit (ECU) of the ADV over a CAN bus, the ECU being configured to generate and issue one or more control commands based on the trajectory data to control the ADV to drive according to the trajectory.

In another aspect of the disclosure, a non-transitory machine-readable medium having instructions stored therein is provided. The instructions, when executed by a processor, cause the processor to perform operations, the operations including: perceiving a driving environment surrounding an autonomous driving vehicle (ADV) based on sensor data obtained from a plurality of sensors, including identifying one or more obstacles; planning a trajectory based on perception data representing the driving environment to drive the ADV navigating through the driving environment; generating trajectory data representing the trajectory including targeted vehicle states at different points in time along the trajectory; and transmitting a stream of controller area network (CAN) messages containing the trajectory data to an electronic control unit (ECU) of the ADV over a CAN bus, the ECU being configured to generate and issue one or more control commands based on the trajectory data to control the ADV to drive according to the trajectory.

In another aspect of the disclosure, a data processing system is provided. The system includes a processor and a memory coupled to the processor to store instructions. The instructions, when executed by the processor, cause the processor to perform operations, the operations including: perceiving a driving environment surrounding an autonomous driving vehicle (ADV) based on sensor data obtained from a plurality of sensors, including identifying one or more obstacles; planning a trajectory based on perception data representing the driving environment to drive the ADV navigating through the driving environment; generating trajectory data representing the trajectory including targeted vehicle states at different points in time along the trajectory; and transmitting a stream of controller area network (CAN) messages containing the trajectory data to an electronic control unit (ECU) of the ADV over a CAN bus, the ECU being configured to generate and issue one or more control commands based on the trajectory data to control the ADV to drive according to the trajectory.

BRIEF DESCRIPTION OF THE DRAWINGS

Embodiments of the disclosure are illustrated by way of example and not limitation in the figures of the accompanying drawings in which like references indicate similar elements.

FIG. 6 is a block diagram illustrating an example of a CAN message according to one embodiment.

DETAILED DESCRIPTION

Figure 1:
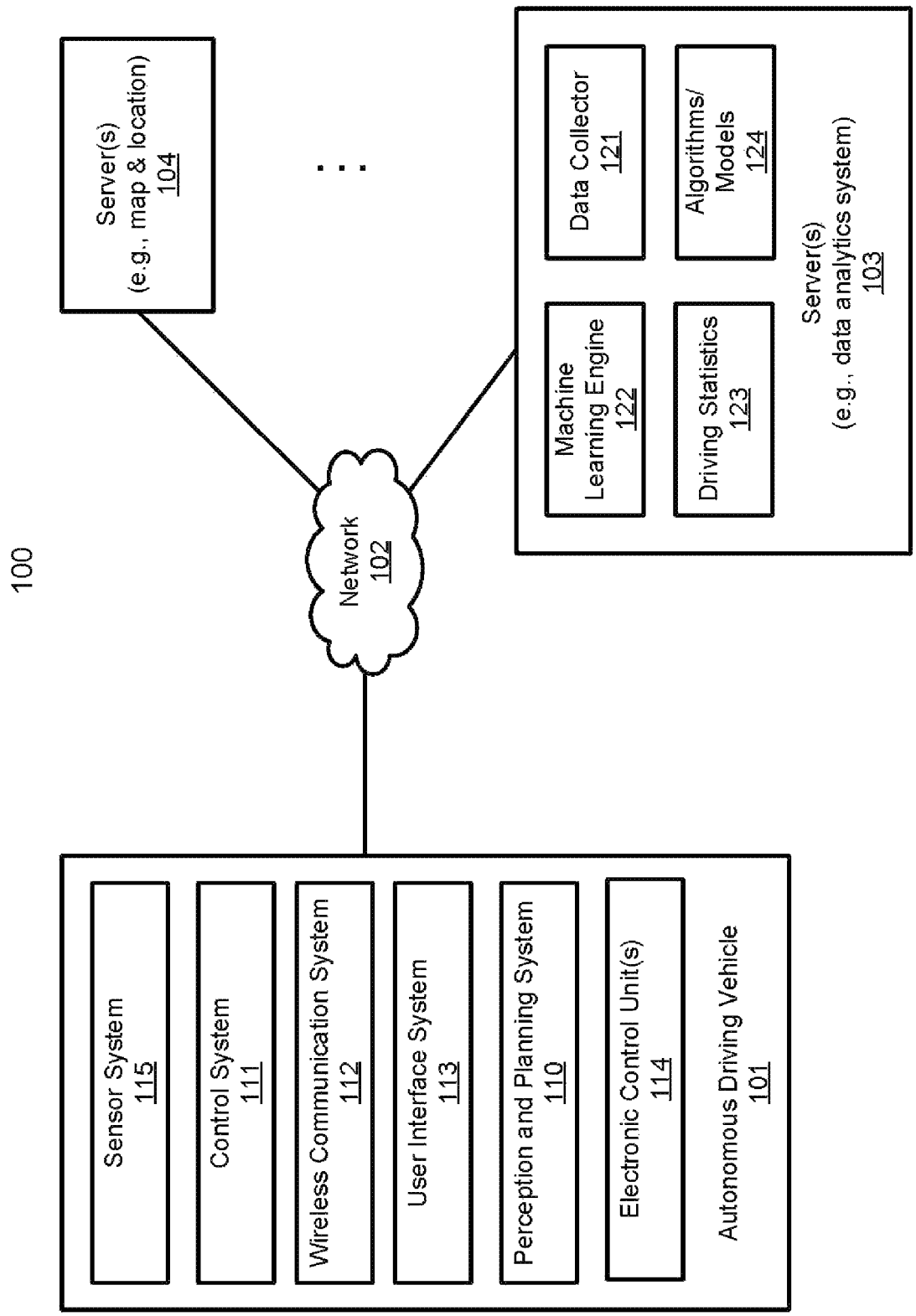
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a communication interface or protocol is utilized between planning and control of autonomous driving to convey necessary information using a limited bandwidth. According to one embodiment, based on sensor data obtained from a variety of sensors, such as LIDAR, cameras, RADAR devices etc., a driving environment surrounding an autonomous driving vehicle (ADV) is perceived, including perceiving and identifying one or more obstacles. A trajectory is planned based on the perception data according to a set of rules to drive the ADV to navigate through the driving environment. Trajectory data representing the trajectory is generated, where the trajectory data includes information indicating target or expected vehicle states (e.g., location, speed, heading direction, curvature) at different points in time along the trajectory. The trajectory data is then encoded and transmitted in a sequence or a stream of one or more controller area network (CAN) messages to an electronic control unit (ECU) of the ADV over a CAN bus. The ECU is configured to generate and issue one or more control commands (e.g., throttle, brake, steering commands) based on the trajectory data to drive the ADV according to the trajectory.

In one embodiment, the trajectory is represented by a sequence of reference points (also referred to as path points) distributed along the trajectory at different points in time. Each reference points is associated with a set of driving parameters or vehicle states that are expected at the corresponding point in time, such as, location, speed, heading direction, curvature, etc. In one embodiment, the sequence of reference points includes a first reference point associated with first location data and a second reference point associated with second location data as a part of the trajectory data. The first location data specifies a first location of the first reference point and the second location data represents a second location of the second reference point. The first location data may encode full location information (e.g., an absolute location) of the first location, while the second location data may encode only the difference between the first location and the second location (e.g., a relative location relative to the first location).

Similarly, according to another embodiment, the first location data or trajectory data associated with the first reference point includes a first curvature of the trajectory corresponding to the first reference point. The second location data or trajectory data associated with the second reference point includes a second curvature of the trajectory corresponding to the second reference point. The second location data includes the difference between the first curvature of the first reference point and the second curvature of the second reference point. The first location data may include the full curvature associated with the first reference point. The first location data may further include a first heading direction associated with the first reference point and the second location data may further include a second heading direction associated with the second reference point. The second location data may encode the difference between the first heading direction and the second heading direction, while the first location data may include the entire first heading direction.

In one embodiment, the second reference point is a subsequent reference point following the first reference point. In a particular embodiment, the second reference point is an immediate adjacent reference point subsequent to the first reference point. The first reference point may be the first overall reference point or leading reference point of the sequence of reference points (e.g., the starting reference point at the beginning of the trajectory). The trajectory data of any subsequent reference points may encode a difference or delta of the trajectory data between the current reference point and an immediate preceding reference point. As a result, the size of a CAN message to store the trajectory data of the subsequent reference points can be reduced.

According to a further embodiment, the reference points are sampled and distributed unevenly along the planned trajectory. The density of the reference points towards to the starting point of the trajectory is higher than the density of the reference points towards the end of the trajectory. That is, the distance between adjacent reference points close to the starting point of the trajectory may be shorter than the distance between adjacent reference points close to the end of the trajectory. The distance between two adjacent reference points may gradually increase from the starting point of the trajectory towards the ending point of the trajectory.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
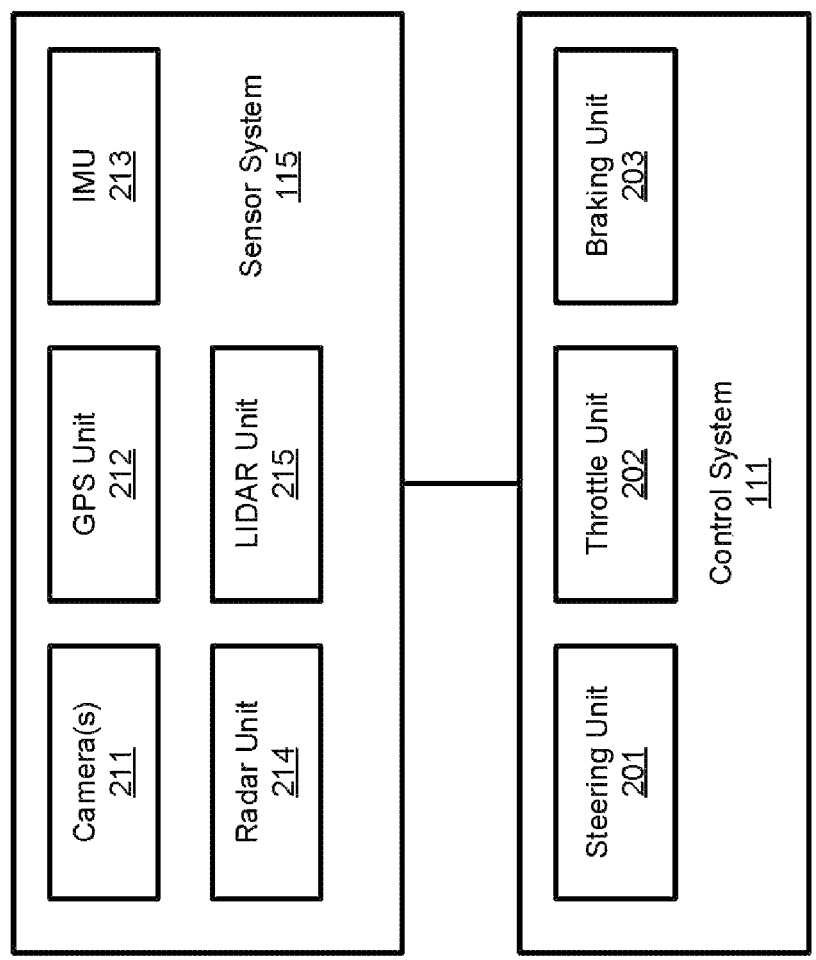
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

The vehicle further includes one or more electronic control units (ECUs) 114 that are typically implemented within a vehicle, which may be communicatively coupled to perception and planning system 110 over a CAN bus. An ECU is an embedded system in automotive electronics that controls one or more of the electrical systems or subsystems in a vehicle. Types of ECUs include an engine control module (ECM), a powertrain control module (PCM), a transmission control module (TCM), Brake Control Module (BCM or EBCM), Central Control Module (CCM), a central timing module (CTM), a general electronic module (GEM), a body control module (BCM), and/or a suspension control module (SCM). Taken together, these systems are sometimes referred to as the vehicle's computer (technically there is no single computer but multiple ones.) Sometimes one assembly incorporates several of the individual control modules (e.g., a PCM is often both engine and transmission).

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an encoding algorithm for communications between planning and controlling using CAN messages over a CAN bus in an ADV. Algorithms 124 can then be uploaded on ADVs to be utilized during autonomous driving in real-time.

Figure 3A:
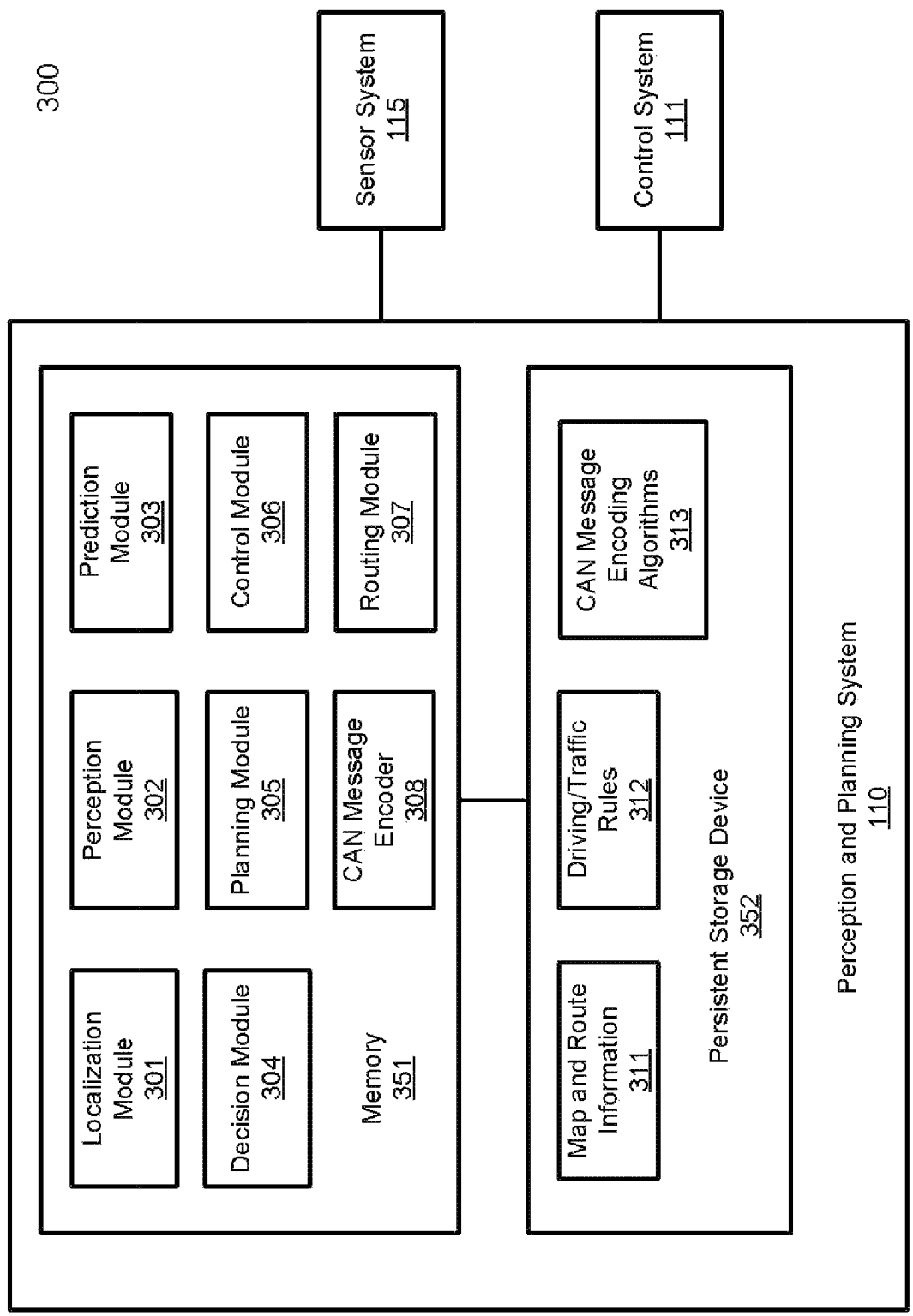
FIGS. 3A-3B are block diagrams illustrating an example of a perception and planning system used with an autonomous vehicle according to one embodiment.
Figure 3B:
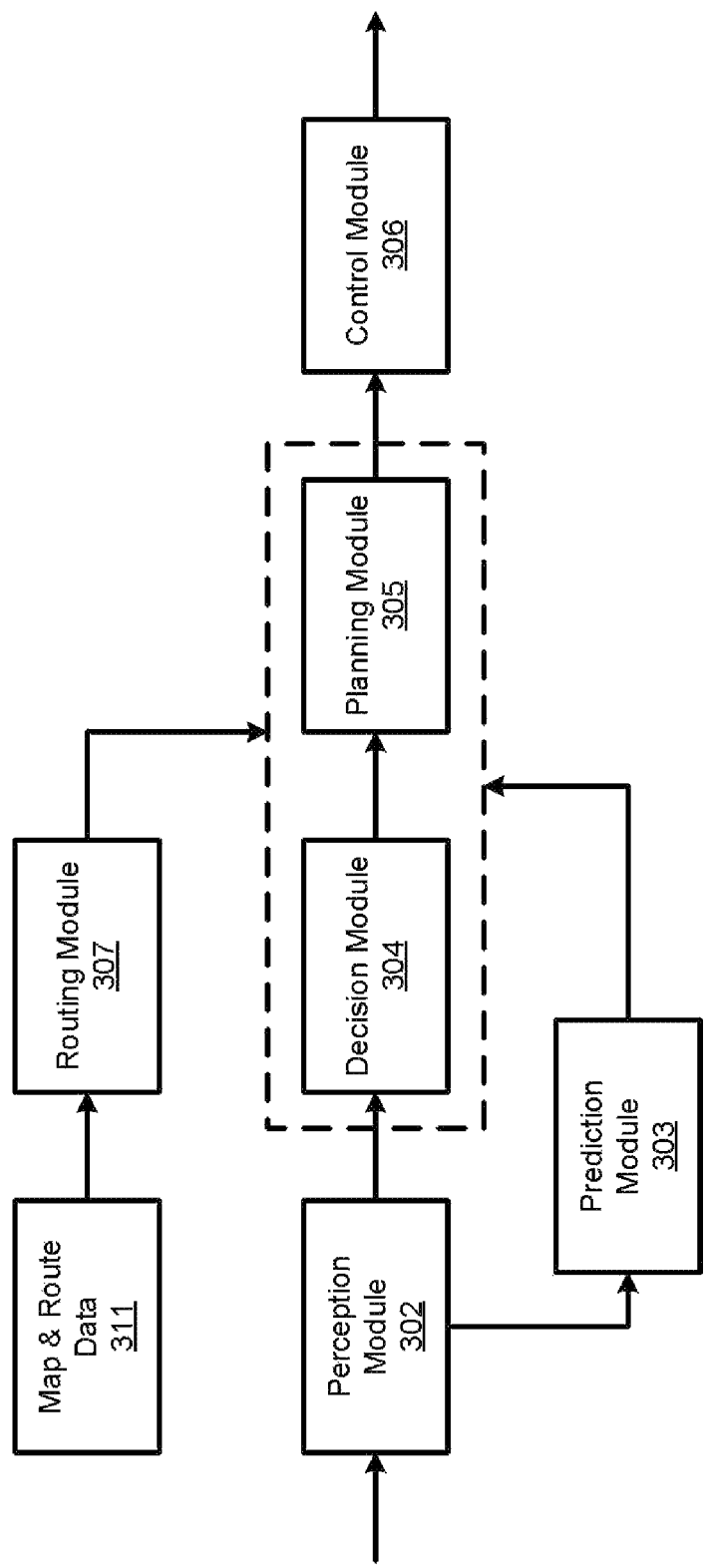

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, CAN message encoder 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In the embodiment as shown in FIGS. 3A-3B, planning module 305 and control module 306 are implemented as a part of perception and planning system 110. In one embodiment, planning module 305 and control module 306 may communicate with each other using Ethernet protocols. When planning module 305 plans and generates a trajectory, the trajectory data representing the trajectory includes the driving parameters or target vehicle states at different points in time along the trajectory. The driving parameters or vehicle states may include a location (e.g., x, y coordinates), speed, heading direction, curvature, etc. The trajectory data is encoded in a series of Ethernet packets that are communicated to control module 306 over an Ethernet connection. Since both planning module 305 and control module 306 are implemented within the physical system, the size of the Ethernet packets would not significantly impact the performance of the communications.

According to another embodiment, planning module 305 may be maintained in perception and planning system 110, but control module 306 may be implemented as a part of an ECU of the ADV, which may be provided by a vehicle provider of the ADV. In this scenario, the provider of perception and planning system 110 and the provider of the ECU of the ADV may be different vendors. The communications between perception and planning system 110 and the ECU of the ADV may be carried over a CAN bus, for example, by encoding the data in a series of one or more CAN messages using CAN message encoder 308.

Figure 4:
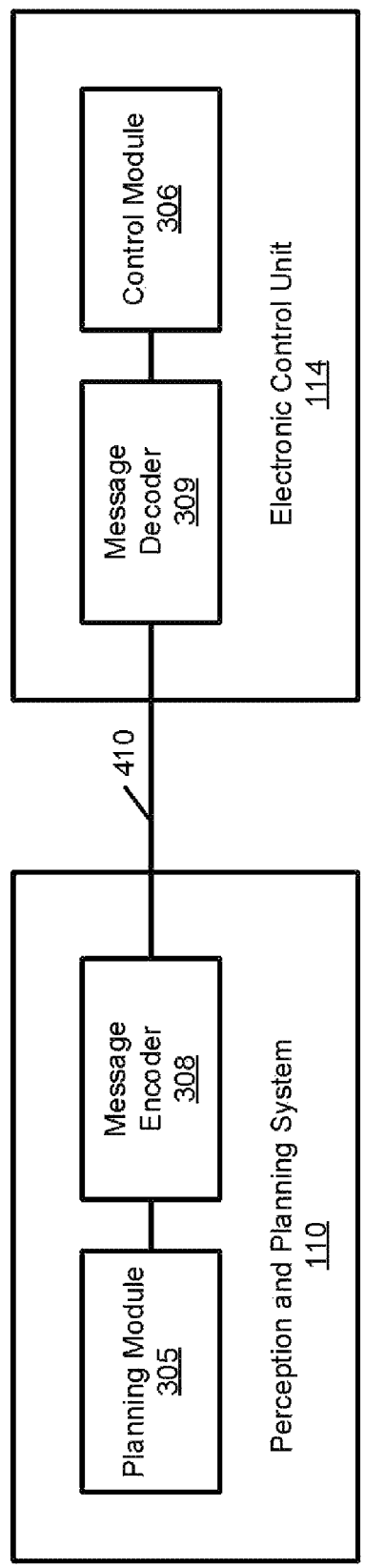
FIG. 4 is a block diagram illustrating an example of an autonomous driving system according to one embodiment.

FIG. 4 is a block diagram illustrating an example of an autonomous driving system according to one embodiment. Referring to FIG. 4, in this embodiment, planning module 305 and control module 306 are implemented in separate systems, i.e., perception and planning system 110 and ECU 114, respectively. System 110 and ECU 114 is communicatively coupled to each other via CAN bus 410. In this example, perception and planning system 110 may be provided by an autonomous driving technology provider (e.g., autonomous driving software and/or hardware vendor). ECU 114 may be provided by a vehicle manufacturer or dealer.

In one embodiment, planning module 305 and control module 306 communicate with each other via a messaging communication protocol, such as CAN communication protocols. Based on the perception information provided by perception module 302 that perceives a driving environment surrounding the vehicle, planning module 305 plans a trajectory to drive the vehicle to navigate around the obstacles identified in the perception data. The trajectory may be represented by a sequence of reference points distributed along the trajectory. Each of the reference points is associated with a set of parameters defining a vehicle state at a particular point in time. The set of parameters may include a location (e.g., x, y coordinates), speed, heading direction, acceleration and/or derivative of acceleration, and curvature and/or derivative of curvature of a particular reference point.

In one embodiment, CAN message encoder 308 is configured to encode the parameters of each reference point in a sequence of one or more CAN messages using a predetermined or agreed upon encoding algorithm (with respect to CAN message decoder 309). The CAN messages are then transmitted to ECU 114 over a CAN bus using a CAN communication protocol. In response to the CAN messages, CAN message decoder 309 is configured to decode the CAN messages to obtain and reconstruct the trajectory data. Based on trajectory data, control module 306 is configured to generate and issue one or more control commands (e.g., throttle, brake, and/or steering commands) to control and drive the vehicle along the planned trajectory.

As described above, each CAN message is limited to a particular size and thus each CAN message can only carry limited amount of information. According to one embodiment, the trajectory data representing a trajectory is compressed by CAN message encoder 308 into a sequence of CAN messages (e.g., 3-5 CAN messages). The CAN messages are transmitted to ECU 114 over the CAN bus and decoded by CAN message decoder 309.

According to one embodiment, at least a portion of trajectory data (also referred to as location data) of a reference point may be encoded as an incremental location data relative to an adjacent or immediate preceding reference point. For example, if a trajectory includes a first reference point immediately followed by a second reference point, the location data of the second reference point may be encoded as a difference between the location data of the first reference point and the location data of the second reference point. As a result, the size of a CAN message required to store the second location data can be reduced, since it does not have to store the entire second location data of the second reference point. For example, if it requires 10 digits to store the entire location of a first reference point, the difference between the location of the first reference point and the location of a second reference point may be stored in lower 5 digits because the values stored in the upper 5 digits may remain the same. As a result, the location data of the second reference point can be encoded to store only the lower 5 digits, as the decoder can derive the upper 5 digits from the location data of the first reference point.

Figure 5:
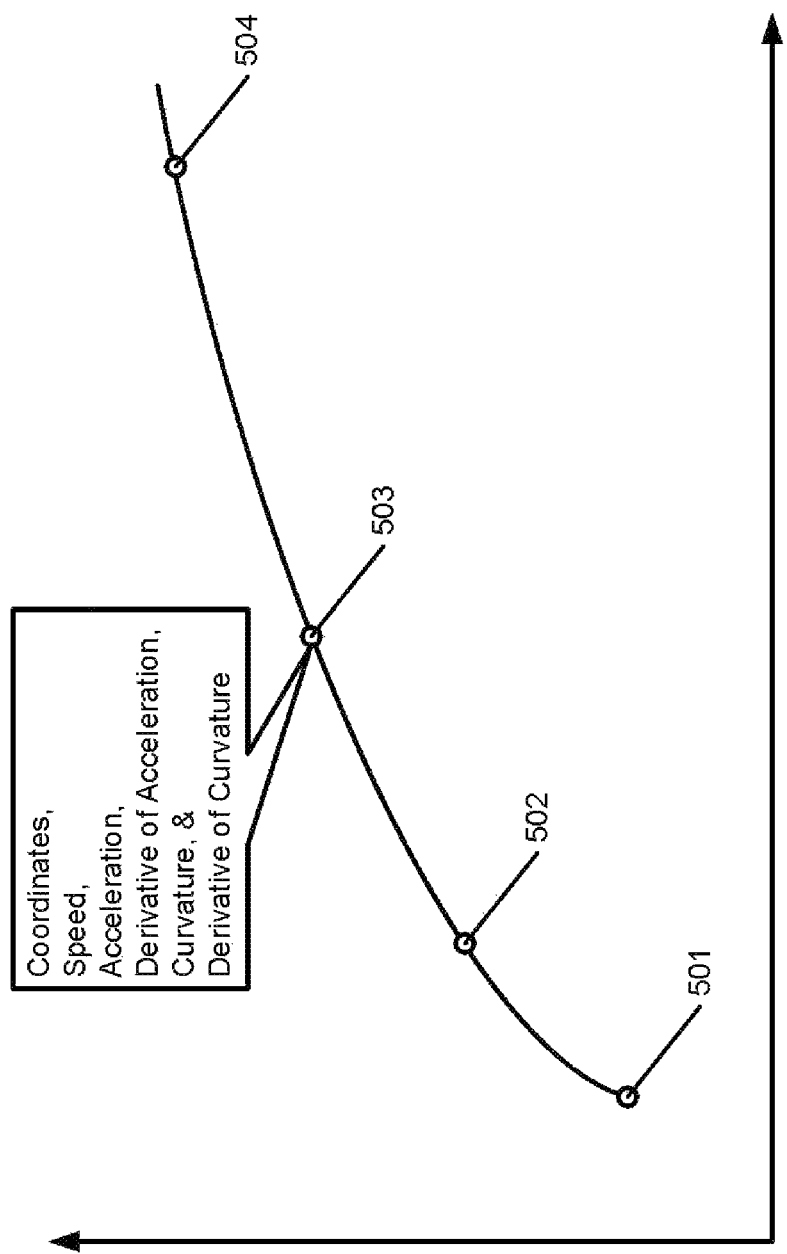
FIG. 5 is a diagram illustrating an example of a trajectory to autonomously drive a vehicle according to one embodiment.

FIG. 5 is a diagram illustrating an example of a trajectory according to one embodiment. Trajectory 500 may be planned and generated by planning module 305 based on perception information provided by perception module 302. Referring to FIG. 5, in this example, trajectory 500 may be represented by a sequence of reference points 501-504, starting from reference point 501. As described above, the location data or trajectory data of each reference point may include coordinates (x, y), a speed, a heading direction, and a curvature at a point in time corresponding to the reference point. The coordinates (x, y) may be absolute or world coordinates such as UTM (Universal Transverse Mercator) coordinates. The trajectory data may further include an acceleration, a derivative of acceleration (e.g., change rate of acceleration), and/or derivative of curvature (e.g., change rate of curvature).

According to one embodiment, when encoding the trajectory data of the first overall or starting reference point such as reference point 501, the full trajectory data of the reference point 501 will be encoded in a CAN message. However, when encoding the trajectory data associated with a subsequent reference point, such as reference point 502, at least a portion of the trajectory data may be compressed by encoding only the difference between the trajectory data of its preceding reference point. For example, when encoding coordinate x1 of reference point 501, the entire x1 will be stored in a CAN message. When encoding coordinate x2 of reference point 502, only the difference between x1 and x2 (x1−x2) may be encoded.

As a result, the message storage space required to store coordinate x2 can be reduced. For example, if each of x1 and x2 requires 10 digits to store the coordinate value, it is likely that the upper (or most significant) 5 digits remain the same for x1 and x2; only the lower (or least significant) 5 digits between x1 and x2 may be different. By only encoding the lower 5 digits of x2, the storage space to store x2 in a CAN message can be reduced. The difference between the coordinates of two reference points is referred to as incremental coordinate or delta coordinate. Similarly, when encoding coordinate x3 of reference point 503, the difference between x2 and x3 (x2−x3) will be encoded, and so on. Similarly, when encoding a curvature of reference point 502, only the difference between the curvatures of reference points 501 and 502 is encoded. When encoding a heading direction of reference point 502, only the difference between the headings of reference points 501 and 502 is encoded.

According to one embodiment, the reference points are unevenly selected or distributed along the trajectory. The density of reference points distributed towards to the starting of the trajectory is higher than the density of reference points distributed towards the end of the trajectory. For example, the distance between reference points 501 and 502 is shorter than the distance between reference points 503 and 504. The rationale behind it is that the portion of the trajectory closer to the vehicle needs to be more accurate than the portion farther away from the vehicle. The portion of the trajectory closer to the vehicle is more likely utilized in a next driving cycle than the portion of trajectory farther away from the vehicle.

For each planning cycle, planning module 305 generate a trajectory and CAN message encoder 308 encodes the trajectory data of the trajectory in a sequence of CAN messages to be transmitted to ECU 114 over a CAN bus. Each CAN message includes a header that includes a sequence number identifying the sequential order of the CAN message. The sequence numbers of the CAN messages allow CAN message decoder 309 to reconstruct the trajectory data in a proper order, as some of the trajectory data of subsequent reference points depends on the trajectory data of its preceding reference point or reference points. The CAN message may further include information indicating a number of reference points included therein, as well as a current control mode of the vehicle.

According to one embodiment, for each planning cycle, planning module 305 will generate and send at least 12 reference points representing a trajectory of around 6 seconds of driving. The 12 reference points are sampled and selected over uneven time intervals, such as, for example, −0.1, 0, 0.1, 0.2, 0.3, 0.5, 0.75, 1, 1.5, 2.0, 4.0, and 6.0 second time intervals. In this way, one can have the short-term values with higher accuracy (e.g., less than 1 second), but also send a trend in the future (e.g., 1-5 seconds). The trajectory data of 12 reference points can be encoded within 3-5 CAN messages. In addition, according to another embodiment, the CAN messages also include a control mode of the vehicle: 1) system not ready, 2) system ready, 3) automatic mode, and 4) error. When in the system-not-ready mode, either planning module 305 or another module is not ready. When in the system-ready mode, the system is still in a manual mode, but is waiting for a signal to transition into an automatic mode. When the control mode is in an error mode, something wrong occurs and the vehicle needs to slow down if the vehicle is in an automatic mode, or the vehicle is blocked from transitioning into an automatic mode unless the error has been reset.

FIG. 6 is a block diagram illustrating an example of a CAN message according to one embodiment. Referring to FIG. 6, CAN message 600 includes header 601, trajectory data of one or more reference points 602-604, and control mode indicator 605. Header 601 may include the information of a typical CAN message, as well as a sequence number indicating a sequential order of the message and message identifier (ID). The trajectory data of the first reference point 602 may include full or all trajectory data, while subsequent reference points 603-604 may encode incremental or differential data with respect to its preceding reference point (e.g., relative coordinates, relative heading, and relative curvature). For example, trajectory data of reference point 603 may be encoded as incremental trajectory data with respect to reference point 602, and trajectory data of reference point 604 may be encoded as incremental trajectory data with respect to reference point 603 or reference point 602. In this example, at the end of the message, a control mode 605 as described above can be included. Alternatively, control mode information 606 may be included as a part of header 601. Other formats may also be implemented.

Figure 7:
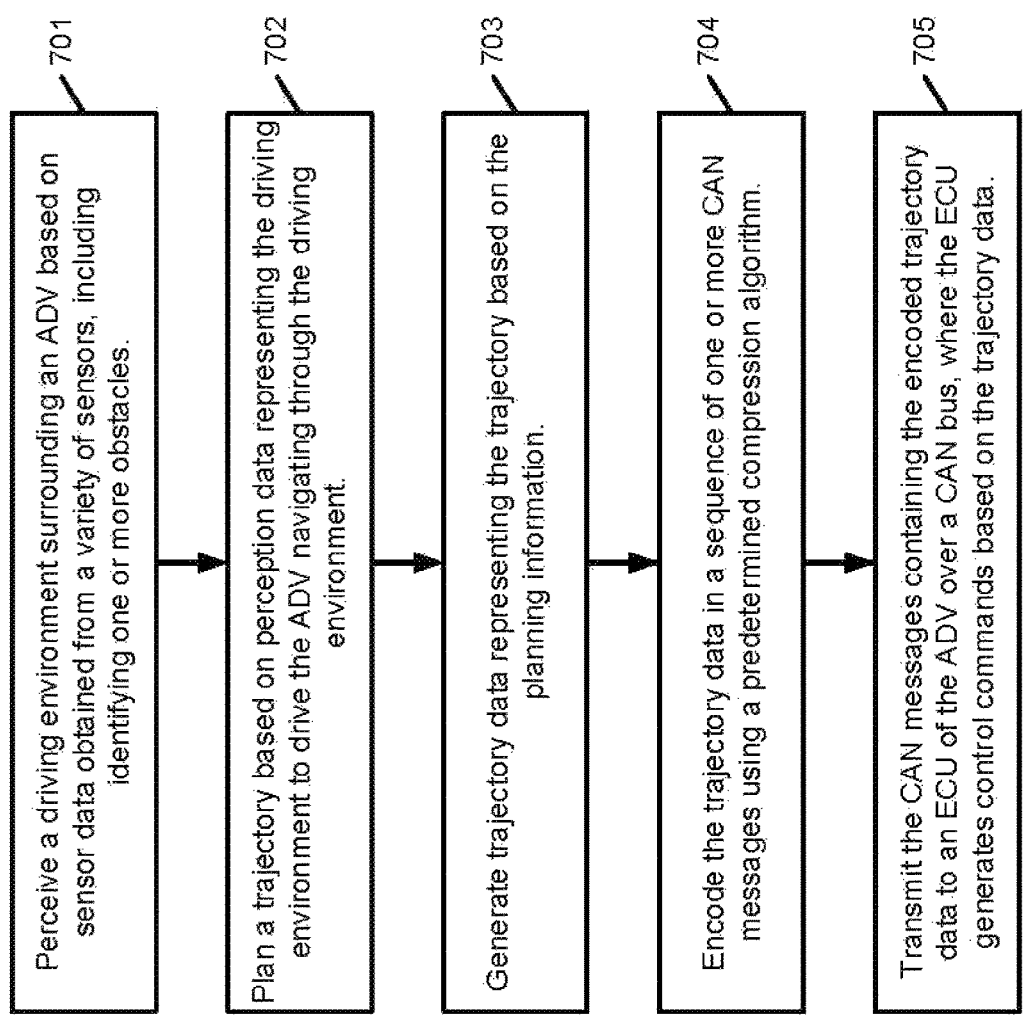
FIG. 7 is a flow diagram illustrating a process of operating an autonomous driving vehicle according to one embodiment.

FIG. 7 is a flow diagram illustrating a process of operating an autonomous driving vehicle according to one embodiment. Process 600 can be performed by processing logic which may include software, hardware, or a combination thereof For example, process 700 may be performed by perception and planning system 110. Referring to FIG. 7, in operation 701, processing logic perceives a driving environment surrounding an ADV based on sensor data obtained from a variety of sensors, including identifying one or more obstacles. In operation 702, processing logic plans a trajectory based on perception data representing the driving environment to drive the ADV navigating through the driving environment. In operation 703, processing logic generates trajectory data representing the trajectory. The trajectory data includes the location, speed, acceleration, curvature, derivative of acceleration, and/or derivative of curvature at different points in time along the trajectory. In operation 704, the trajectory data is encoded into a sequence of one or more CAN messages using a predetermined data compression algorithm as described above. In operation 705, a stream of the CAN messages containing the trajectory data are transmitted to an ECU of the ADV. At least some of the trajectory data is compressed using the data compression techniques described above. The ECU is configured to generate and issue one or more control commands based on the trajectory data to control the ADV to drive according to the trajectory.

Note that some or all of the components as shown and described above may be implemented in software, hardware, or a combination thereof For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
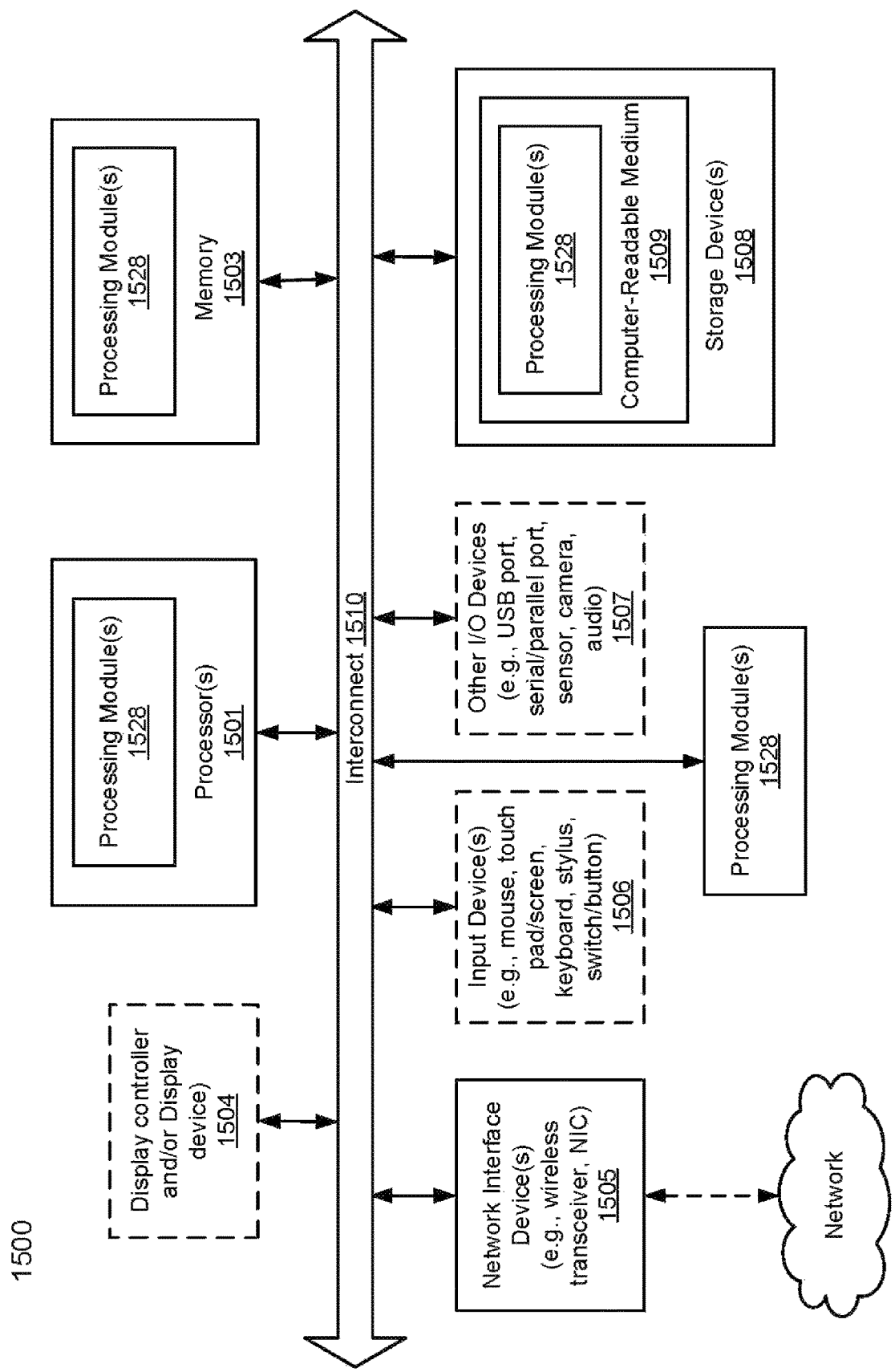
FIG. 8 is a block diagram illustrating a data processing system according to one embodiment.

FIG. 8 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, or message encoder 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   perceiving a driving environment surrounding an autonomous driving vehicle (ADV) based on sensor data obtained from a plurality of sensors, including identifying one or more obstacles;
   planning a trajectory based on perception data representing the driving environment to drive the ADV navigating through the driving environment;
   generating trajectory data representing the trajectory including targeted vehicle states at different points in time along the trajectory, wherein the trajectory data includes first location data representing a first location of a first reference point and second location data representing a second location of a second reference point, and wherein the second location data encodes a difference between the first location and the second location; and
   transmitting a stream of controller area network (CAN) messages containing the trajectory data to an electronic control unit (ECU) of the ADV over a CAN bus, wherein the ECU is configured to generate and issue one or more control commands based on the trajectory data to control the ADV to drive according to the trajectory.

2. The method of claim 1, wherein the trajectory comprises a sequence of reference points at different points in time, and wherein the trajectory data comprises one or more driving parameters associated with each of the reference points.

3. The method of claim 1, wherein the first location data includes an absolute location of the first location, and wherein the second location data includes a relative location of the second location relative to the first location.

4. The method of claim 1, wherein the second reference point is a subsequent reference point in sequence adjacent to the first reference point.

5. The method of claim 1, wherein the first location data includes a first curvature of the first reference point, and wherein the second location data includes a difference between the first curvature of the first reference point and a second curvature of the second reference point.

6. The method of claim 1, wherein the first location data includes a first heading direction of the first reference point, and wherein the second location data includes a difference between the first heading direction of the first reference point and a second heading direction of the second reference point.

7. The method of claim 2, wherein the trajectory data includes a full absolute location of a first overall reference point of the reference points of the trajectory, wherein for each of the reference points subsequent to the first overall reference point, the trajectory data includes a relative location relative to an immediate preceding reference point of the subsequent reference point.

8. The method of claim 2, wherein the reference points are unevenly distributed along the trajectory, wherein density of the reference points towards a starting point of the trajectory is higher than density of the reference points towards an ending point of the trajectory.

9. A non-transitory machine-readable medium having instructions stored therein, which when executed by a processor, cause the processor to perform operations, the operations comprising:
   perceiving a driving environment surrounding an autonomous driving vehicle (ADV) based on sensor data obtained from a plurality of sensors, including identifying one or more obstacles;
   planning a trajectory based on perception data representing the driving environment to drive the ADV navigating through the driving environment;
   generating trajectory data representing the trajectory including targeted vehicle states at different points in time along the trajectory, wherein the trajectory data includes first location data representing a first location of a first reference point and second location data representing a second location of a second reference point, and wherein the second location data encodes a difference between the first location and the second location; and
   transmitting a stream of controller area network (CAN) messages containing the trajectory data to an electronic control unit (ECU) of the ADV over a CAN bus, wherein the ECU is configured to generate and issue one or more control commands based on the trajectory data to control the ADV to drive according to the trajectory.

10. The machine-readable medium of claim 9, wherein the trajectory comprises a sequence of reference points at different points in time, and wherein the trajectory data comprises one or more driving parameters associated with each of the reference points.

11. The machine-readable medium of claim 9, wherein the first location data includes an absolute location of the first location, and wherein the second location data includes a relative location of the second location relative to the first location.

12. The machine-readable medium of claim 9, wherein the second reference point is a subsequent reference point in sequence adjacent to the first reference point.

13. The machine-readable medium of claim 9, wherein the first location data includes a first curvature of the first reference point, and wherein the second location data includes a difference between the first curvature of the first reference point and a second curvature of the second reference point.

14. The machine-readable medium of claim 9, wherein the first location data includes a first heading direction of the first reference point, and wherein the second location data includes a difference between the first heading direction of the first reference point and a second heading direction of the second reference point.

15. The machine-readable medium of claim 10, wherein the trajectory data includes a full absolute location of a first overall reference point of the reference points of the trajectory, wherein for each of the reference points subsequent to the first overall reference point, the trajectory data includes a relative location relative to an immediate preceding reference point of the subsequent reference point.

16. The machine-readable medium of claim 10, wherein the reference points are unevenly distributed along the trajectory, wherein density of the reference points towards a starting point of the trajectory is higher than density of the reference points towards an ending point of the trajectory.

17. A data processing system, comprising:
a processor; and
a memory coupled to the processor to store instructions, which when executed by the processor, cause the processor to perform operations, the operations including perceiving a driving environment surrounding an autonomous driving vehicle (ADV) based on sensor data obtained from a plurality of sensors, including identifying one or more obstacles,
planning a trajectory based on perception data representing the driving environment to drive the ADV navigating through the driving environment,
generating trajectory data representing the trajectory including targeted vehicle states at different points in time along the trajectory, wherein the trajectory data includes first location data representing a first location of a first reference point and second location data representing a second location of a second reference point, and wherein the second location data encodes a difference between the first location and the second location, and
transmitting a stream of controller area network (CAN) messages containing the trajectory data to an electronic control unit (ECU) of the ADV over a CAN bus, wherein the ECU is configured to generate and issue one or more control commands based on the trajectory data to control the ADV to drive according to the trajectory.

18. The system of claim 17, wherein the trajectory comprises a sequence of reference points at different points in time, and wherein the trajectory data comprises one or more driving parameters associated with each of the reference points.

19. The system of claim 17, wherein the first location data includes an absolute location of the first location, and wherein the second location data includes a relative location of the second location relative to the first location.

20. The system of claim 17, wherein the second reference point is a subsequent reference point in sequence adjacent to the first reference point.

* * * * *